(12) United States Patent
Bueeler et al.

(10) Patent No.: US 8,944,647 B2
(45) Date of Patent: Feb. 3, 2015

(54) ILLUMINATION SOURCE WITH VARIABLE DIVERGENCE

(75) Inventors: Michael Bueeler, Zurich (CH); Manuel Aschwanden, Allenwinden (CH)

(73) Assignee: Optotune AG, Dietikon (CH)

( * ) Notice: Subject to any disclaimer, the term of this patent is extended or adjusted under 35 U.S.C. 154(b) by 94 days.

(21) Appl. No.: 13/820,400

(22) PCT Filed: Sep. 2, 2010

(86) PCT No.: PCT/CH2010/000216
§ 371 (c)(1),
(2), (4) Date: Mar. 13, 2013

(87) PCT Pub. No.: WO2012/027851
PCT Pub. Date: Mar. 8, 2012

(65) Prior Publication Data
US 2013/0170220 A1      Jul. 4, 2013

(51) Int. Cl.
| | | |
|---|---|---|
| *F21V 13/02* | (2006.01) | |
| *F21V 5/00* | (2006.01) | |
| *F21K 99/00* | (2010.01) | |
| *F21V 5/04* | (2006.01) | |
| *F21V 7/00* | (2006.01) | |
| *F21V 13/12* | (2006.01) | |
| *F21V 14/06* | (2006.01) | |
| *F21V 17/02* | (2006.01) | |
| *G02B 3/14* | (2006.01) | |
| *G02B 19/00* | (2006.01) | |

(Continued)

(52) U.S. Cl.
CPC . *F21V 5/008* (2013.01); *F21K 9/00* (2013.01); *F21V 5/04* (2013.01); *F21V 7/0083* (2013.01); *F21V 7/0091* (2013.01); *F21V 13/12* (2013.01); *F21V 14/06* (2013.01); *F21V 17/02* (2013.01); *G02B 3/14* (2013.01); *G02B 19/0061* (2013.01); *F21Y 2101/02* (2013.01); *F21Y 2105/001* (2013.01)
USPC ........................ 362/343; 362/296.01; 362/297

(58) Field of Classification Search
None
See application file for complete search history.

(56) References Cited

U.S. PATENT DOCUMENTS

| | | |
|---|---|---|
| 60,109 A | 11/1866 | Woodward |
| 4,572,616 A | 2/1986 | Kowel et al. |
| 4,783,153 A | 11/1988 | Kushibiki et al. |

(Continued)

FOREIGN PATENT DOCUMENTS

| | | |
|---|---|---|
| EP | 2075630 A1 | 7/2009 |
| EP | 2239792 A1 | 10/2010 |

(Continued)

OTHER PUBLICATIONS

Zhang et al., "Fluidic adaptive lens with high focal length tunability", *Applied Physics letter*, 82(19): 3171-3172 (2003).

(Continued)

*Primary Examiner* — Donald Raleigh
(74) *Attorney, Agent, or Firm* — Marshall, Gerstein & Borun LLP

(57) ABSTRACT

The illumination source has a LED light source (2) generating a first divergent light field (6). The light from the LED light source (2) is processed by a first optical element (10), in particular a first lens element, to generate a second divergent light field (19). The first divergent light field (19) is processed by a second optical element (20) having a variable lens variable focus in order to generate a third light field (35) whose divergence can be varied.

14 Claims, 2 Drawing Sheets

(51) Int. Cl.
*F21Y 101/02* (2006.01)
*F21Y 105/00* (2006.01)

(56) References Cited

U.S. PATENT DOCUMENTS

| | | | |
|---|---|---|---|
| 4,783,155 | A | 11/1988 | Imataki et al. |
| 4,802,746 | A | 2/1989 | Baba et al. |
| 5,138,494 | A | 8/1992 | Kurtin |
| 5,212,583 | A | 5/1993 | Vali et al. |
| 5,438,486 | A | 8/1995 | McNair |
| 5,446,591 | A | 8/1995 | Medlock |
| 5,774,273 | A | 6/1998 | Bornhorst |
| 5,917,657 | A | 6/1999 | Kaneko et al. |
| 5,999,328 | A | 12/1999 | Kurtin et al. |
| 6,040,947 | A | 3/2000 | Kurtin et al. |
| 6,340,824 | B1 * | 1/2002 | Komoto et al. ............... 257/99 |
| 6,538,823 | B2 | 3/2003 | Kroupenkine et al. |
| 6,542,309 | B2 | 4/2003 | Guy |
| 6,715,876 | B2 | 4/2004 | Floyd |
| 6,859,333 | B1 | 2/2005 | Ren et al. |
| 6,864,951 | B1 | 3/2005 | Ren et al. |
| 7,079,203 | B1 | 7/2006 | Huang et al. |
| 7,085,065 | B2 | 8/2006 | Silver |
| 7,209,280 | B2 | 4/2007 | Goossens |
| 7,382,976 | B1 | 6/2008 | Mok et al. |
| 7,643,217 | B2 | 1/2010 | Yokoyama et al. |
| 7,660,025 | B2 | 2/2010 | Kim et al. |
| 7,672,059 | B2 | 3/2010 | Batchko et al. |
| 7,675,686 | B2 | 3/2010 | Lo et al. |
| 7,697,214 | B2 | 4/2010 | Batchko et al. |
| 7,768,712 | B2 | 8/2010 | Silver et al. |
| 7,826,145 | B2 | 11/2010 | Justis et al. |
| 8,000,022 | B2 | 8/2011 | Niederer |
| 2002/0118464 | A1 | 8/2002 | Nishioka et al. |
| 2002/0154380 | A1 | 10/2002 | Gelbart |
| 2003/0123159 | A1 | 7/2003 | Morita et al. |
| 2003/0147046 | A1 | 8/2003 | Shadduck |
| 2004/0001180 | A1 | 1/2004 | Epstein |
| 2004/0174610 | A1 | 9/2004 | Aizenberg et al. |
| 2005/0030438 | A1 | 2/2005 | Nishioka |
| 2005/0100270 | A1 | 5/2005 | O'Connor et al. |
| 2006/0045501 | A1 | 3/2006 | Liang et al. |
| 2006/0061729 | A1 | 3/2006 | Shadduck |
| 2006/0087614 | A1 | 4/2006 | Shadduck |
| 2006/0164593 | A1 | 7/2006 | Peyghambarian et al. |
| 2006/0164731 | A1 | 7/2006 | Wu et al. |
| 2007/0122132 | A1 | 5/2007 | Misawa et al. |
| 2007/0201138 | A1 | 8/2007 | Lo |
| 2007/0263293 | A1 | 11/2007 | Batchko et al. |
| 2008/0112059 | A1 | 5/2008 | Choi et al. |
| 2008/0144185 | A1 | 6/2008 | Wang et al. |
| 2008/0198334 | A1 | 8/2008 | Kasazumi et al. |
| 2008/0204909 | A1 | 8/2008 | Shiota et al. |
| 2008/0252960 | A1 | 10/2008 | Hendriks et al. |
| 2008/0259463 | A1 | 10/2008 | Shepherd |
| 2008/0284285 | A1 | 11/2008 | Sato |
| 2009/0161239 | A1 | 6/2009 | Verhaar et al. |
| 2009/0296408 | A1 * | 12/2009 | Hendriks et al. ......... 362/311.01 |
| 2009/0303613 | A1 | 12/2009 | Kinoshita et al. |
| 2009/0310209 | A1 | 12/2009 | Aschwanden et al. |
| 2010/0118414 | A1 | 5/2010 | Bolis |
| 2010/0202054 | A1 | 8/2010 | Niederer |
| 2010/0232030 | A1 | 9/2010 | Dobrusskin |
| 2010/0296148 | A1 * | 11/2010 | Reichelt et al. ............... 359/228 |
| 2011/0080740 | A1 * | 4/2011 | Allen et al. ................... 362/294 |
| 2011/0149410 | A1 | 6/2011 | Blum |
| 2011/0267680 | A1 | 11/2011 | Aschwanden |

FOREIGN PATENT DOCUMENTS

| | | |
|---|---|---|
| JP | 60-220301 A | 11/1985 |
| JP | 1-166003 A | 6/1989 |
| JP | 1-166004 A | 6/1989 |
| JP | 8-114703 A | 5/1996 |
| JP | 11-133210 A | 5/1999 |
| JP | 2000-81504 | 3/2000 |
| JP | 2002-131513 A | 5/2002 |
| JP | 2003-114309 A | 4/2003 |
| WO | WO-2005/040909 A1 | 5/2005 |
| WO | WO-2005077714 | 8/2005 |
| WO | WO-2008138010 A1 | 11/2008 |
| WO | WO-2009076477 | 6/2009 |

OTHER PUBLICATIONS

Duncan Graham-Rowe, "Liquid lenses make a splash", *Nature Publishing Group*, pp. 2-4 (2006).

Schneider et al., "Adaptive Fluidic PDMS-Lens with Integrated Piezoelectric Actuator", *MEMS*, pp. 120-123 (2008).

Ren et al., "Tunable-focus liquid lens controlled using a servo motor", *Optical Society of America*, 14(18): 8031-8036 (2006).

International Search Report and the Written Opinon in corresponding PCT/CH2010/000216 mailed May 10, 2011.

"We are now poLight", *poLight*, 3 pages (2008).

U.S. Appl. No. 60/226,174, filed Aug. 15, 2000.

* cited by examiner

ILLUMINATION SOURCE WITH VARIABLE DIVERGENCE

TECHNICAL FIELD

The invention relates to an illumination source having a LED light source and variable optics for generating a light field with variable divergence. The invention also relates to an optical assembly for such an illumination source.

BACKGROUND ART

For illumination purposes, a light source should advantageously generate a light field having an intensity distribution that decays continuously and monotonically in radial direction, or that is homogeneous over a certain radius.

However, an LED light source, in particular an LED light source comprising a large LED or an array of LEDs, is not a point light source, and the photons emitted by its active surface are divergent and have poor spatial correlation. Hence, it is difficult to process the light field emitted by an LED light source in order to efficiently obtain a light field suited for illumination purposes.

US 2006/0045501 describes an LED light source that generates a divergent light field. This light field is processed by a first optical element structured to generate a collimated light field. The collimated light field is sent onto a second optical element having variable focus. The second optical element generates a light field of variable divergence.

DISCLOSURE OF THE INVENTION

It is a general object of the invention to provide an alternative illumination source of this type.

This object is achieved by the illumination source of claim 1. Accordingly, the illumination source comprises the following components:

An LED light source generates a first divergent light field. The first divergent light field has a first divergence.

A first optical element is arranged and structured to receive all or at least part of the first divergent light field and to generate a second divergent light field therefrom. In other words, the light field generated by the first optical element is still divergent, and not collimated. However, the divergence of the second light field, subsequently called the "second divergence", is smaller than the first divergence.

A second optical element located downstream from the first optical element comprises a variable lens having a lens interface with variable curvature. The second optical element is arranged and structured to receive all or at least part of the second divergent light field and to generate a third light field with variable divergence. The divergence of the third light field can be varied by varying the curvature of the lens interface of the second optical element.

In contrast to prior art solutions, therefore, the present design relies on having a divergent light field between the first and the second optical element. The advantages of this design can be twofold:

The first optical element can be of simpler design as compared to the design where the second light field had to be collimated.

The divergence of the second light field makes it easier to achieve a large diameter light field at the input side of the second optical element. A too small diameter would require a second optical element of very small dimensions, which would be difficult to manufacture and to align.

Advantageously, the first optical element comprises light scattering structures that scatter the light from the light source. It is found that this measure improves the homogeneity and monotonous lateral intensity decay of the outgoing third light field. In addition, using scattering structures is particularly advantageous if the LED light source comprises a plurality of LEDs having different emission spectra because the scattering structures tend to mix the colors from the different LEDs, thereby generating a more homogeneously colored third light field.

In a particularly advantageous embodiment, the variable-curvature interface separates a higher refractive section from a lower refractive section, and the higher refractive section is arranged at a side of the interface facing the led light source. The interface forms, for at least some of the curvatures that it is designed to have, a convex surface of the higher refractive section. In other words, the section with the higher refractive index has a convex side facing away from the LED light source. It has been found that this measure reduces spherical aberrations and leads to a more monotonous radial intensity decay of the outgoing third light field.

In this context, the terms "higher refractive section" and "lower refractive section" are to be understood as describing that the space at one side of the interface has higher refractive index than at the other side of the interface. This space can e.g. be a liquid at one side and air at the other side, or two liquids of different index of refraction.

The invention also relates to an optical assembly for an illumination source of the type above comprising the first and the second optical element as described above, which are suitable to be combined with an LED light source in order to build the illumination source of claim 1.

In other words, such an assembly comprises a first optical element structured to receive first divergent light field from an LED light source and to generate a second divergent light field with a second divergence, wherein said second divergence is smaller than said first divergence, and a second optical element comprising a variable lens having a lens interface with variable curvature, wherein said variable lens is arranged and structured to receive said second divergent light field and to generate a third light field with variable divergence.

The invention is particularly suited for illumination purposes, in particular for spotlights having variable divergence.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

The "divergence" of a light field designates the half-angle of divergence of the light field in the far field, i.e. at a distance much larger than the wavelength from a minimum diameter of the light field.

The term "divergent light field" designates a light field having a divergence exceeding 10°.

A "collimated beam" or "collimated light field" designates a light field having a divergence substantially equal to 0°.

The term "axial" designates the direction parallel to the optical axis 1 of the system, the term "radial" the directions perpendicular thereto.

Figure 1:
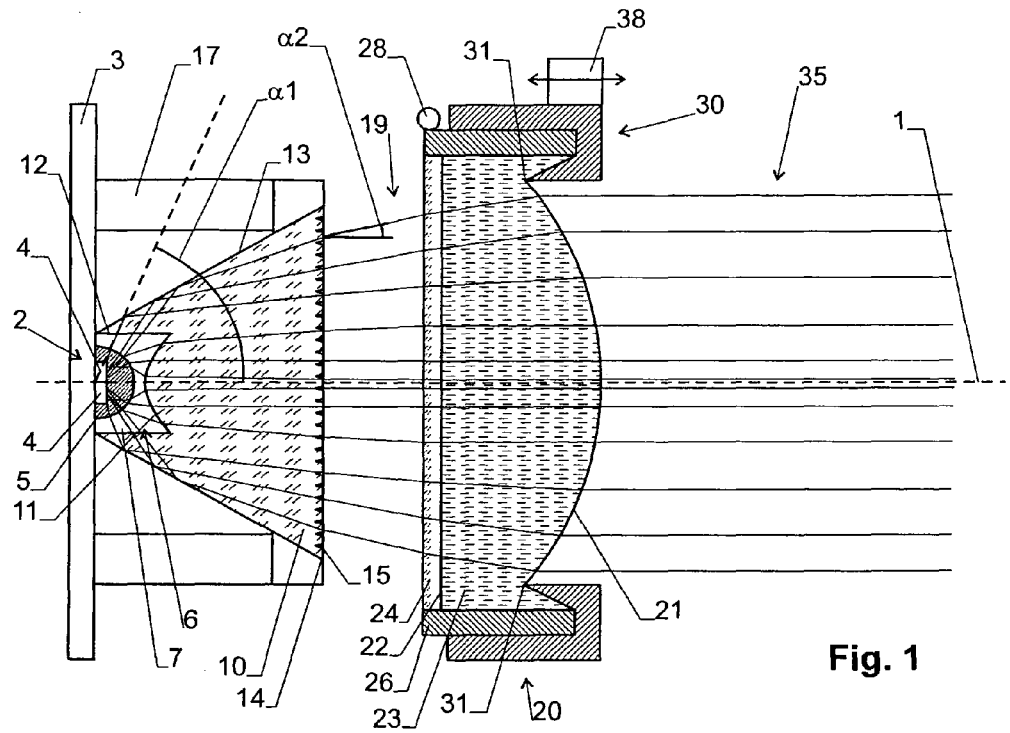
FIG. 1 shows a sectional view of an illumination source with its second optical element being adjusted to generate a substantially collimated beam.
Figure 2:
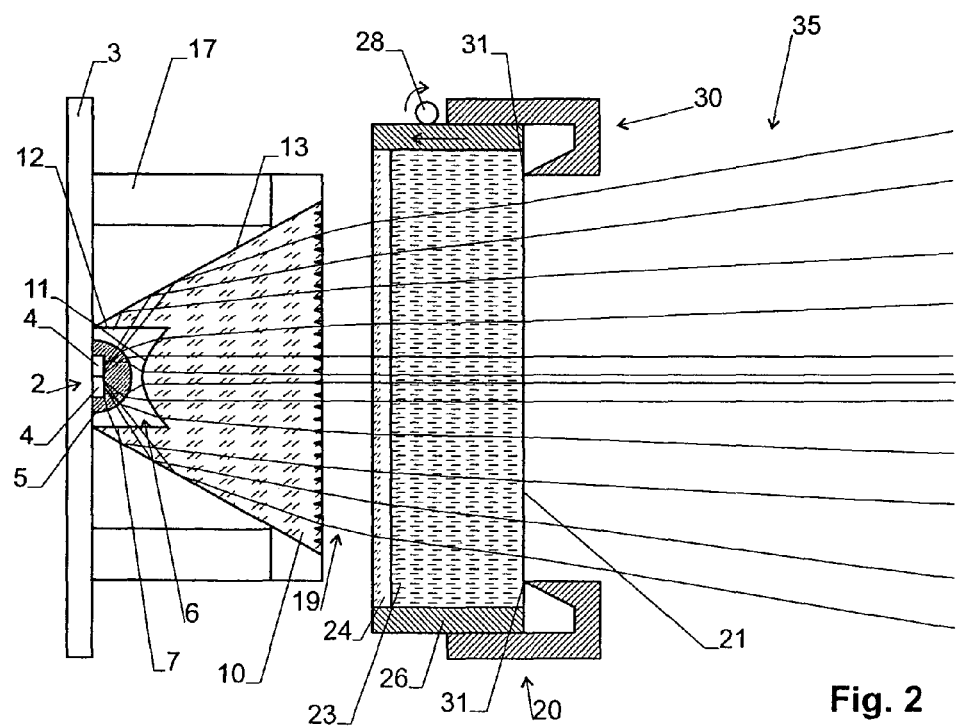
FIG. 2 shows the illumination source of FIG. 1 with its second optical element being adjusted to generate a substantially divergent beam.

Illumination Source Design:

FIGS. 1 and 2 show a first embodiment of an illumination source. The illumination source is advantageously of substantially rotational symmetric design about an optical axis 1, but it may also be non-symmetric, depending on the desired geometry of the outgoing light field.

The illumination source comprises an LED light source 2, which can e.g. be mounted on a substrate 3. The LED light source comprises one or more LEDs 4. If several LEDs 4 are used, they are advantageously arranged side-by-side on substrate 3.

LED light source 2 can comprise a plurality of LEDs 4 having different emission spectra in order to generate a light field having a mixed color different from the color that can be obtained from a single LED. For example, LED light source 2 can comprise three red, three green and one blue LED in order to generate light of substantially white color.

The LEDs 4 may also comprise luminescent substances for modifying their color as known to the skilled person.

Advantageously, LED light source 2 further comprises a primary lens element 5 cast over the LEDs 4, thereby embedding at least a part of each LED 4. Such a primary lens, which is known to the skilled person, allows to slightly decrease the extremely high divergence of the light exiting from the active surface of the LEDs.

The light field exiting from the LED light source 2 is called the "first light field" 6 and it has a first divergence $\alpha 1$, which is typically between 50 and 70 degrees.

Primary lens element 5 is arranged at least partially in a recess 7 of a first lens element 10. First lens element 10 is advantageously separate from primary lens element 5 and is formed by a single lens body. Recess 7 is axially delimited by a convex section 11 of first lens element 10 and radially by a cylindrical or frusto-conical section 12 of first lens element 10. Further, first lens element 10 comprises an outer surface 13, which e.g. may be frusto-conical or, more generally, flared, with a radial diameter increasing away from LED light source 2. Outer surface 13 forms a mirror for light beams within first lens element 10, advantageously using total internal reflection. Finally, first lens element 10 comprises a substantially flat or slightly curved exit surface 14 facing away from LED light source 2, through which light exits. Lenses of this design are known to the skilled person as "LED lenses" or "TIR lenses".

Advantageously, exit surface 14 is a light scattering surface. For this purpose, fine scattering structures 15, such as small recesses or grooves, are distributed over surface 14. Using a light scattering surface is particularly advantageous in combination with multi-color light sources as described in the summary of the invention above. However, light scattering structures are also advantageous in combination with a uniformly colored light source as they has been found to improve the homogeneity (or the radial decay properties) of the light emitted by the illumination source.

A support 17 is provided for mounting first lens element 10, e.g. on substrate 3.

The design of first lens element 10 is known to a skilled person. Lens elements of this type are generally used for decreasing the convergence of the light from LED light sources.

In the present design, first lens element 10 is chosen and positioned such that the light field 19 exiting from first lens element is still divergent. This light field 19 is subsequently called the "second light field" and it has a second divergence $\alpha 2$, which is smaller than the first divergence $\alpha 1$. Advantageously, though, second divergence $\alpha 2$ is at least 10°, in particular at least 17°.

Second light field 19 impinges on a second optical element 20. Second optical element 20 located downstream from first lens element 10, advantageously at a distance therefrom.

Second optical element 20 comprises a variable lens of adjustable focal length. This type of adjustable lenses is known to the skilled person and e.g. described in WO 2009/021344.

In one advantageous embodiment, second optical element 20 comprises a flexible, elastic membrane 21 enclosing an opening of an otherwise closed, rigid cavity 22. Cavity 22 is filled with a liquid 23. Membrane 21 forms the axial exit surface of cavity 22 that faces away from LED light source 2, while the axial entry surface of cavity 22 is formed by a transparent, rigid wall 24. Radially, cavity 22 is enclosed by a rigid cylindrical wall 26. Membrane 21 is suspended within wall 26.

In the present embodiment, cavity 22 is axially displaceable by means of a displacement mechanism, schematically illustrated at reference number 28. Displacement mechanism may be manually or electrically operated.

Further, second optical element 20 of the present embodiment comprises a lens shaper 30 having an annular edge 31 abutting against membrane 21. Lens shaper 30 is stationary. Hence, when displacing cavity 22 by means of displacement mechanism 28, lens shaper 30 exerts a varying force against membrane 21, thereby deforming, it. This is illustrated in FIGS. 1 and 2, where FIG. 1 shows cavity 22 in a position where lens shaper 30 deforms membrane 21 strongly into a convex shape, while FIG. 2 shows cavity 22 in a position where lens shaper 30 does not exert substantial force on membrane 21 and membrane 21 is basically flat.

Specific designs of such a lens element are disclosed in WO 2009/021344.

In more general terms, as mentioned in the summary of the invention above, second optical element 20 comprises a lens interface (formed by membrane 21) of variable curvature. By varying this curvature, the focal length of second lens element 20 can be changed.

In the situation as shown in FIG. 1, second optical element 20 is configured to have a short focal length because liquid 23 forms a plano-convex lens with its convex side strongly curved. In the situation shown in FIG. 2, second optical element 20 has a very large focal length, in the present example infinite focal length, because membrane 21 is basically flat.

As a consequence, the divergence of the light field 35 exiting from second optical element 20 can be varied. In the case of FIG. 1, the divergence of the exiting light field is substantially zero or at least small because second optical element 20 is configured to substantially compensate the divergence $\alpha 2$ of second light field 19. In the case of FIG. 2, the divergence of third light field 35 is substantially equal to the divergence $\alpha 2$ of second light field 19 because liquid 23 substantially forms a slab having parallel axial surfaces and therefore does affect the divergence of the light passing through it.

In this manner, the divergence of the third light field 35 can be varied easily.

The exact design of second optical element 20 is not of primary relevance. Various types of variable lenses can be used, e.g. also those described in US 2006/0045501.

Second optical element 20 has a focal length that can be varied over a certain focal range. Advantageously, at least part of said range is larger than or equal to zero, i.e. lens element 20 can be configured to be a positive (converging) lens in order to reduce the divergence of second light field 19. However, if second optical element 20 should also be able to widen the divergence of second light field 19, at least part of the range can be smaller than zero, i.e. lens element 20 can be configured to be a negative (diverging) lens. An advantageous range of the focal length is between −100 mm and infinite for the negative range and between 30 mm and infinite for the positive range.

In order to further optimize the third light field, the distance between the first and second optical elements 10, 20, can, advantageously, be adjustable. This is schematically illustrated in FIG. 1 by an adjusting element 38, which couples second optical element 20 to substrate 3. Again, adjusting element 38 may be manually or electrically operated.

The system described here is readily adapted to different types of LED light sources. Since the first and second optical elements 10, 20 are separate, the first lens element can be modified to account for LED light sources of different spatial emission characteristics without a need to adapt the second optical element as well. In other words, a set of different first lens elements can be provided, each of which is optimized for a different type of LED light source. All of these first lens elements can be combined with a single type of second optical element.

Figure 3:
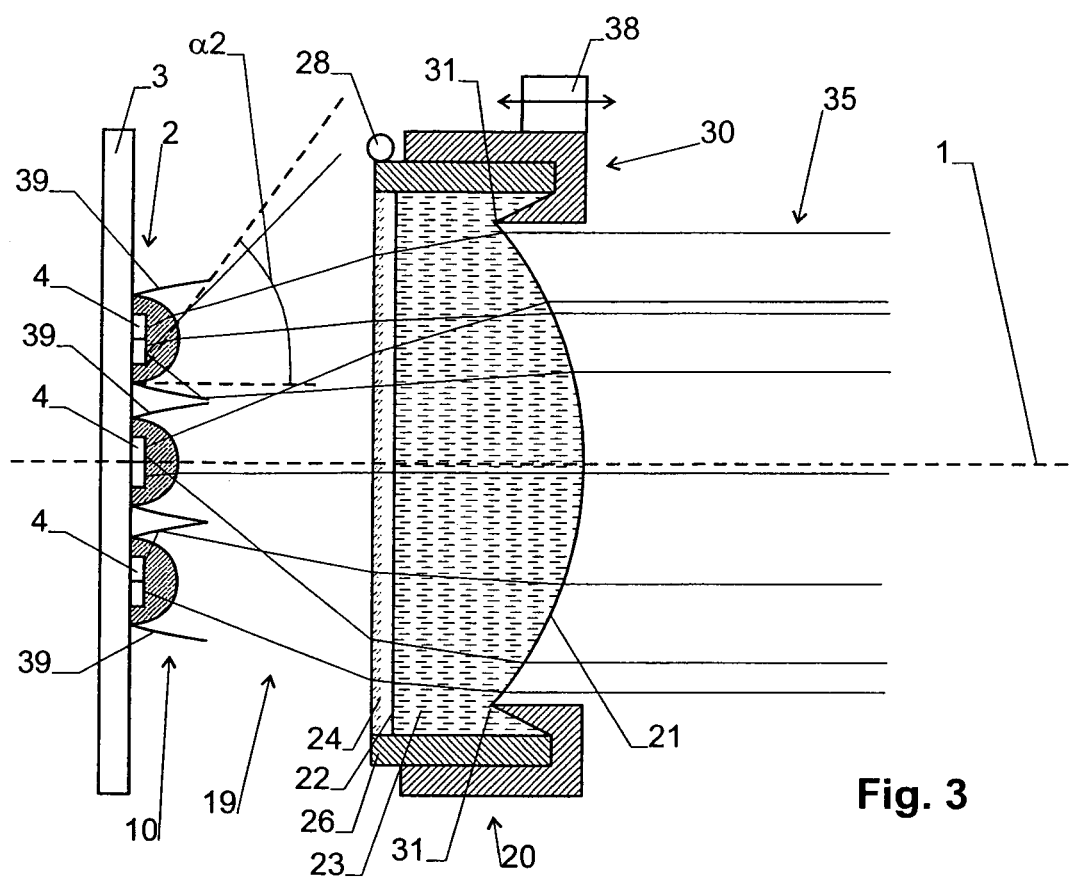
FIG. 3 shows a second embodiment of an illumination source with an LED array and a reflector array.

FIG. 3 shows a second embodiment of an illumination source. In this second embodiment, the LED light source consists of an array of LEDs 4 (each of which can be a single LED or, in turn, an assembly of several LEDs, e.g. of different colors). Each LED 4 is enclosed in a primary lens 5, and it is located at a base of a reflector 39, which may be a parabolic reflector or a reflector of higher order.

In other words, the second embodiment has an LED light source 2 comprising a plurality of LEDs 4, and the first optical element 10 comprises an array of reflectors 39. At least one LED 4 is arranged in each reflector 39. The light from the LED light source 2 has a large "first" divergence, similar to the divergence α1 of the embodiment of FIGS. 1 and 2, while the optical element 10 decreases the same to a "second" divergence having an angle α2<α1. The second light field 19 emerging from the reflectors 39, i.e. from the first optical element 10, enters second optical element 20 and is processed therein in a manner similar to the first embodiment.

For example, in the configuration shown in FIG. 3, second optical element 20 and in particular its variable lens is positioned to generate a roughly collimated third light field (even though a high quality collimation can never be achieved for light from such an extended light source). When increasing the focal length of the lens of FIG. 3, the divergence of third light field 35 increases as well.

Notes:

In FIGS. 1-3, the axial entry side of second optical element 20, which is formed by wall 24, is shown to be flat. It must be noted, however, that it might also be curved in order to adapt the properties of second optical element 20 to a desired range of focal lengths.

The illumination source of the present invention can e.g. be incorporated into a spotlight equipped with a user-operated part that allows to manually change the focal length of second optical element 20, either directly by hand (e.g. by rotating a ring of the hosing) or indirectly by using a tool (e.g. a screwdriver).

While there are shown and described presently preferred embodiments of the invention, it is to be distinctly understood that the invention is not limited thereto but may be otherwise variously embodied and practiced within the scope of the following claims.

The invention claimed is:

1. An illumination source comprising
an LED light source generating a first divergent light field with a first divergence,
a first optical element arranged and structured to receive said first divergent light field and to generate a second divergent light field with a second divergence, wherein said second divergence is smaller than said first divergence, and
a second optical element comprising a variable lens having a lens interface with variable curvature, wherein said variable lens is arranged and structured to receive said second divergent light field and to generate a third light field with variable divergence, and
wherein said second divergence is at least 10°.

2. The illumination source of claim 1 wherein said LED light source comprises at least one LED and a primary lens element, wherein said LED is at least partially embedded in said primary lens element, and wherein said primary lens element is separate from said first optical element.

3. The illumination source of claim 2 wherein said primary lens element is arranged at least partially in a recess in said first optical element.

4. The illumination light source of claim 1 wherein said first optical element comprises a first lens element.

5. The illumination source of claim 4 wherein said first lens element is a single lens body.

6. The illumination light source of claim 1 wherein said first optical element comprises an array of reflectors and said LED light source comprises an array of LEDs, wherein at least one LED is arranged in each reflector.

7. The illumination source of claim 1 wherein said first optical element comprises light scattering structures scattering the light field from the LED light source.

8. The illumination source of claim 7 wherein said light scattering structures are arranged on a light scattering surface of said first optical element, wherein the light scattering surface faces said second optical element.

9. The illumination source of claim 1 wherein a distance between said first optical element and said second optical element is adjustable.

10. The illumination source of claim 1 wherein said lens interface separates a higher refractive section from a lower refractive section, with said higher refractive section being arranged at a side of said lens interface facing said LED light source, and wherein said lens interface is a convex surface of said higher refractive section for at least some of the variable curvatures of said lens interface.

11. The illumination source of claim 1 wherein said LED light source comprises a plurality of LEDs having different emission spectra.

12. The illumination source of claim 1 wherein a focal length of said second optical element can be varied over a focal range, wherein at a least part of said focal range is larger than or equal to zero.

13. The illumination source of claim 1 wherein said second optical element is located at a distance from said first optical element.

14. The illumination source of claim 1 wherein said second divergence is at least 17°.

* * * * *

UNITED STATES PATENT AND TRADEMARK OFFICE
CERTIFICATE OF CORRECTION

| | | |
|---|---|---|
| PATENT NO. | : 8,944,647 B2 | Page 1 of 1 |
| APPLICATION NO. | : 13/820400 | |
| DATED | : February 3, 2015 | |
| INVENTOR(S) | : Michael Bueeler et al. | |

It is certified that error appears in the above-identified patent and that said Letters Patent is hereby corrected as shown below:

In the Claims:

At Column 6, line 14, "comprising" should be -- comprising: --.

At Column 6, line 36, "light source" should be -- source --.

At Column 6, line 40, "light source" should be -- source --.

Signed and Sealed this
Fifth Day of January, 2016

Michelle K. Lee
*Director of the United States Patent and Trademark Office*